United States Patent [19]
Crocker

[11] Patent Number: 5,358,178
[45] Date of Patent: Oct. 25, 1994

[54] VEHICLE CAB HEATER

[76] Inventor: Allan L. Crocker, 11605 N. Highway 14, Brooklyn, Wis. 53521

[21] Appl. No.: 100,257

[22] Filed: Aug. 2, 1993

[51] Int. Cl.$^5$ ............................................. B60H 1/02
[52] U.S. Cl. ................................. 237/12.3 A; 454/160
[58] Field of Search .................... 237/12.3 A, 12.3 B, 237/12.3 R; 165/51; 123/142.5; 454/145, 146, 159, 160, 161, 162

[56] References Cited

U.S. PATENT DOCUMENTS

| | | | |
|---|---|---|---|
| 4,093,119 | 6/1978 | Swisher | 237/12.3 A |
| 4,252,271 | 2/1981 | Green | 237/12.3 A |

*Primary Examiner*—Henry A. Bennet

[57] ABSTRACT

A new and improved vehicle cab heater includes a shroud assembly capable of fitting over a radiator and radiator fan on a water-cooled engine. A conduit is connected between the vehicle cab and the shroud assembly for conveying heated air from the radiator to the vehicle cab. A manually operated valve assembly is located at an end of the conduit. The valve assembly includes an exterior portion located outside of the vehicle cab and includes an interior portion located inside the vehicle cab. The valve assembly includes an exterior valve subassembly for controlling air flow from the shroud assembly to outside the vehicle cab, and the valve assembly also includes an interior valve subassembly for controlling air flow from the shroud assembly to inside the vehicle cab. A handle assembly is capable of being attached to the valve assembly. The valve assembly includes a handle-receiving portion and a guide slot located in an extension assembly. The guide slot is capable of permitting a portion of the handle assembly to pass through the extension assembly for connecting the handle assembly to the valve assembly. A flexible hose assembly may be attachable to the extension assembly. The flexible hose assembly permits air from the shroud assembly to be selectively directed to selected locations in the vehicle cab.

12 Claims, 4 Drawing Sheets

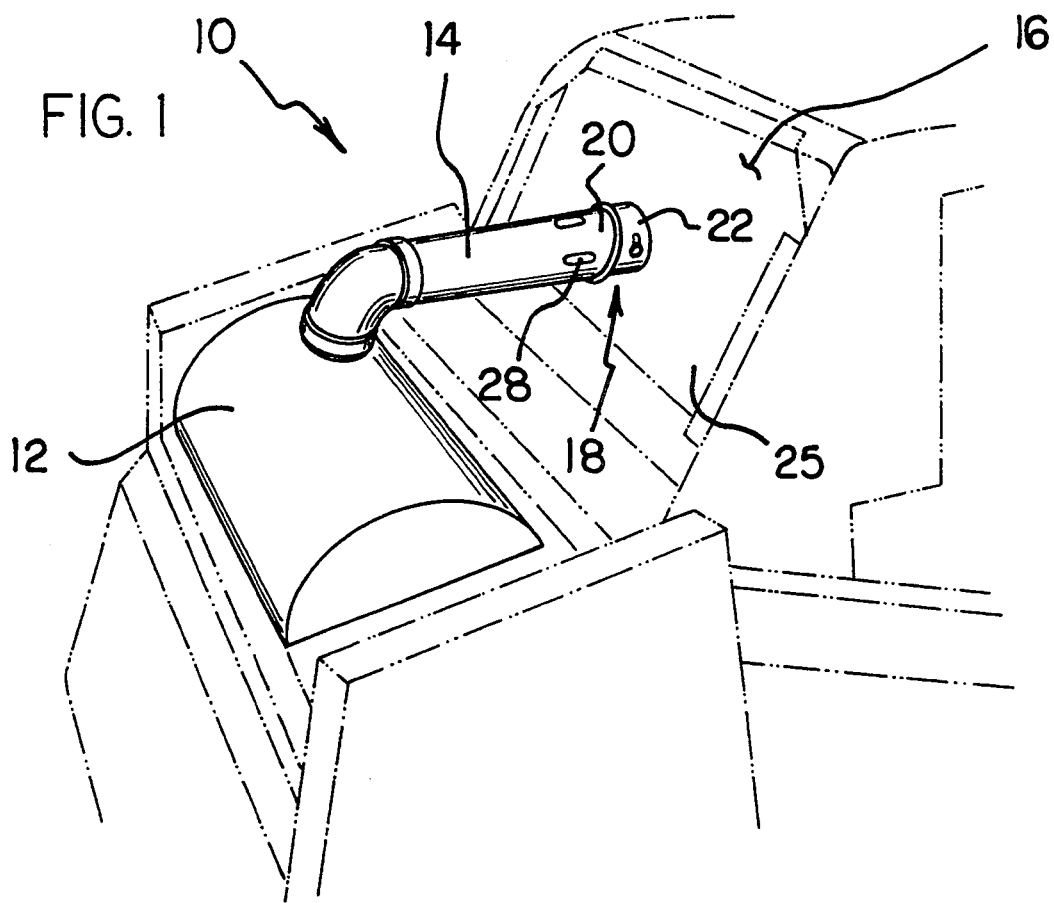
FIG. 1
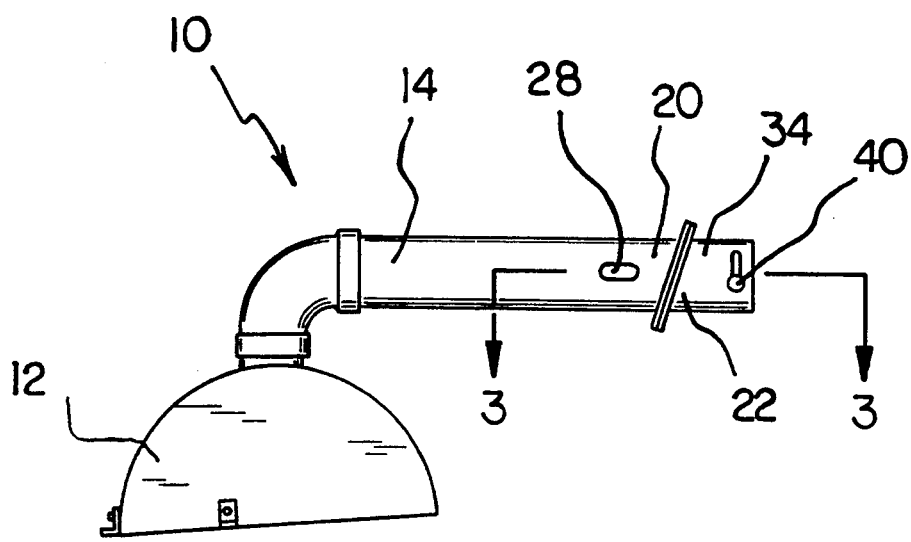

VEHICLE CAB HEATER

BACKGROUND OF THE INVENTION

1. Field of the Invention

The present invention relates generally to heaters for automotive vehicles, and, more particularly, to heaters especially adapted for heating the interior of a cab of a vehicle used in the construction industry and other industries.

2. Description of the Prior Art

Heating the interior of automotive vehicles is done in many contexts. The interiors of passenger vehicles are most often heated by routing liquid coolant with hoses into a heat exchanger located in the passenger compartment. However, for a number of reasons, automotive vehicles used in the construction industry and other industries do not employ such a heating system for the cab of the vehicle. In this respect, it would be desirable if a device were provided for heating the cab of an industrial vehicle which provided heat to the cab without using hoses carrying liquid coolant into the cab of the vehicle.

Many industrial vehicles are not provided with cab heaters. Therefore, it may be necessary to retrofit an industrial vehicle with a heater for the cab. In this respect, it would be desirable if a device were provided for heating the cab of an industrial vehicle which is easy to retrofit to the vehicle cab.

Throughout the years, a number of innovations have been developed relating to heating vehicles, and the following U.S. patents are representative of some of those innovations: 4,828,170; 4,977,952; 5,025,986; 5,090,474; and 5,114,071. More specifically, U.S. Pat. No. 4,828,170 discloses a heating device for heating the passenger compartment of a motor vehicle which employs a thermal reactor between a catalytic reactor and a combustion gas outlet. U.S. Pat. No. 4,977,952 discloses a heat storage device which includes a plurality of zones separated by intermediate spaces from each other. U.S. Pat. No. 5,025,986 discloses a heating system for a motor vehicle with an air-cooled rear engine which includes an integrated sound absorbing device. U.S. Pat. No. 5,090,474 discloses a heat storage device for a motor vehicle. U.S. Pat. No. 5,114,071 discloses another heat storage device for a motor vehicle.

The devices disclosed in the patents cited above are all relatively complex devices having many expensive and specially fabricated components. In this respect, it would be desirable if a device were provided for heating the cab of an industrial vehicle which is very simple in construction. Moreover, it would be desirable if a heater for a vehicle cab were provided that can employ inexpensive off-the-shelf items.

Still other features would be desirable in a vehicle cab heater. For example, it would be desirable if a vehicle cab heater had an easy way to regulate the amount of heat that is directed to the cab. It would also be desirable if a vehicle cab heater included a flexible hose that would permit concentration of warm air onto selected areas inside the vehicle cab.

A flexible hose should be equipped with a nozzle to concentrate the flow of warm air. In certain instances, it would be desirable if the nozzle could be supported in a selected position over a period of time without the need for manually orienting the nozzle. In this respect, it would be desirable if a device were provided for heating the cab of an industrial vehicle which included means for supporting a nozzle on a flexible hose in a desired position.

Many prior art heating systems for vehicles include quite a number of moving parts such as fans and thermostats. Moving parts often fail to operate properly. Very often they need periodic maintenance and lubrication to keep them operating properly. In a vehicle cab heater, it would be desirable of the disadvantages of moving parts could be eliminated. In this respect, it would be desirable if a device were provided for heating the cab of an industrial vehicle which included only a minimum of moving parts.

There is one particular vehicle that is of special interest. This is a Bobcat brand skidloader. It is noted that this vehicle has a radiator cooled motor and has a muffler located near the radiator. The radiator and the muffler are two sources of engine heat that can be utilized for heating the interior of the vehicle cab. In this respect, it would be desirable if a device were provided for heating the cab of an industrial vehicle which utilizes both the heat of the radiator and the heat of the muffler for heating the interior of the vehicle cab.

The radiator of a water-cooled engine has a fan for blowing air across the radiator. In this respect, it would be desirable if a device were provided for heating the cab of an industrial vehicle which utilizes the radiator fan for blowing warm air into the vehicle cab.

Thus, while the foregoing body of prior art indicates it to be well known to use vehicle heaters, the prior art described above does not teach or suggest a vehicle cab heater which has the following combination of desirable features: (1) provides heat to the cab without using hoses carrying liquid coolant into the cab of the vehicle; (2) is easy to retrofit to the vehicle cab; (3) is very simple in construction; (4) can employ inexpensive off-the-shelf items; (5) has an easy way to regulate the amount of heat that is directed to the cab; (6) includes a flexible hose that would permit concentration of warm air onto selected areas inside the vehicle cab; (7) includes means for supporting a nozzle on a flexible hose in a desired position; (8) includes only a minimum of moving parts; (9) utilizes both the heat of the radiator and the heat of the muffler for heating the interior of the vehicle cab; and (10) utilizes the radiator fan for blowing warm air into the vehicle cab. The foregoing desired characteristics are provided by the unique vehicle cab heater of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved vehicle cab heater which includes a shroud assembly capable of fitting over a radiator and radiator fan on a water-cooled engine. A conduit is connected between the vehicle cab and the shroud assembly for conveying heated air from the radiator to the vehicle cab. A manually operated valve assembly is located at an end of the conduit. The valve assembly includes an exterior portion located outside of the vehicle cab and includes an interior portion located inside the vehicle cab. The valve assembly includes an exterior valve subassembly for controlling air flow from the shroud assembly to outside the vehicle cab, and the valve assembly also includes an interior valve subassembly for controlling air flow from the shroud assembly to inside the vehicle cab. The exterior valve subassembly includes a first external aperture in the conduit, and a manually adjustable valve element is located inside the conduit. The valve element includes a first internal aperture capable of being selectively placed in registration with the first external aperture, such that warmed air from the shroud assembly can be selectively retained in or exited from the conduit to outside the vehicle cab.

The interior valve subassembly includes an extension assembly capable of being juxtaposed against the conduit. The extension assembly extends into the vehicle cab from the conduit. A second external aperture is located on the extension assembly, and a manually adjustable valve element is located inside the extension assembly. The valve element includes a second internal aperture capable of being selectively placed in registration with the second external aperture, such that warmed air from the shroud assembly can be selectively retained in or exited from the conduit into the vehicle cab.

The valve element is a single valve element that includes the first internal aperture and the second internal aperture. A handle assembly is capable of being attached to the valve element. The valve element includes a handle-receiving portion and a guide slot located in the extension assembly. The guide slot is capable of permitting a portion of the handle assembly to pass through the extension assembly for connecting the handle assembly to the valve element. The second internal aperture and the first internal aperture are oriented on the valve element, and the first external aperture and the second external aperture are oriented on the conduit and the extension assembly, respectively, such that, when the handle assembly is located at one extremity of the guide slot, the first internal aperture and the first external aperture are in full registration. The second internal aperture and the second external aperture are completely out of registration, and air flows from the shroud assembly to outside the vehicle cab without any air flowing from the shroud assembly to inside the vehicle cab. When the handle assembly is located at another extremity of the guide slot, the first internal aperture and the first external aperture are completely out of registration, the second internal aperture and the second external aperture are in complete registration, and air flows from the shroud assembly to inside the vehicle cab without any air flowing from the shroud assembly to outside the vehicle cab. When the handle assembly is located at a location in between the extremities of the guide slot, the first internal aperture and the first external aperture are in partial registration, the second internal aperture and the second external aperture are in partial registration, and a portion of air flowing from the shroud assembly flows to outside the vehicle cab, and a portion of the air flowing from the shroud assembly flows to inside the vehicle cab.

A flexible hose assembly may be attachable to the extension assembly. The flexible hose assembly permits air from the shroud assembly to be selectively directed to selected locations in the vehicle cab. The flexible hose assembly includes a valve assembly for controlling air flow exiting from the extension assembly. A flexible hose is connected to the valve assembly, for channeling air flow to manually selected locations inside the vehicle cab, and a nozzle assembly is connected to the valve assembly, for directing air flow to the selected locations inside the vehicle cab.

The valve assembly includes an exterior extension portion which extends out from the extension assembly. A first exterior aperture is located on the exterior extension and is in direct communication with the interior of the vehicle cab. A hose connector fixture extends from the exterior extension. A second exterior aperture is located in the hose connector fixture for directing air from the extension assembly into the flexible hose. A manually rotatable interior valve member is supported inside the exterior extension. An interior aperture located on the interior valve member, and a handle assembly is used for manually rotating the interior valve member inside the exterior extension, such that the interior aperture can be selectively placed in registration with the exterior aperture for directing warmed air directly into the vehicle cab or selectively placed in registration with the first exterior aperture for directing warmed air into the flexible hose.

A threaded lock bolt and a complementary threaded well is located in the exterior extension. The lock bolt is used to lock the interior valve member into a selected position with respect to the exterior extension.

The nozzle assembly includes a nozzle element attached to the flexible hose, and a suction cup attached to the nozzle element. Preferably, the extension assembly and the exterior extension are formed as a unified structure.

A fan assembly may be located within the conduit. A battery is used for powering the fan assembly, and a switch is used for controlling electric power flow from the battery to the fan assembly. The battery may be the vehicle battery.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved vehicle cab heater which has all of the advantages of the prior art and none of the disadvantages.

It is another object of the present invention to provide a new and improved vehicle cab heater which may be easily and efficiently manufactured and marketed.

It is a further object of the present invention to provide a new and improved vehicle cab heater which is of durable and reliable construction.

An even further object of the present invention is to provide a new and improved vehicle cab heater which is susceptible of a low cost of manufacture with regard to both materials and labor, and which accordingly is then susceptible of low prices of sale to the consuming public, thereby making such vehicle cab heater available to the buying public.

Still yet a further object of the present invention is to provide a new and improved vehicle cab heater which provides heat to the cab without using hoses carrying liquid coolant into the cab of the vehicle.

Still another object of the present invention is to provide a new and improved vehicle cab heater that is easy to retrofit to the vehicle cab.

Yet another object of the present invention is to provide a new and improved vehicle cab heater which is very simple in construction.

Even another object of the present invention is to provide a new and improved vehicle cab heater that can employ inexpensive off-the-shelf items.

Still a further object of the present invention is to provide a new and improved vehicle cab heater which has an easy way to regulate the amount of heat that is directed to the cab.

Yet another object of the present invention is to provide a new and improved vehicle cab heater that includes a flexible hose that would permit concentration of warm air onto selected areas inside the vehicle cab.

Still another object of the present invention is to provide a new and improved vehicle cab heater which includes means for supporting a nozzle on a flexible hose in a desired position.

Yet another object of the present invention is to provide a new and improved vehicle cab heater that includes only a minimum of moving parts.

Still a further object of the present invention is to provide a new and improved vehicle cab heater that utilizes both the heat of the radiator and the heat of the muffler for heating the interior of the vehicle cab.

Yet a further object of the present invention is to provide a new and improved vehicle cab heater which utilizes the radiator fan for blowing warm air into the vehicle cab.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first preferred embodiment of the vehicle cab heater of the invention installed on an industrial vehicle known as a skidloader.

FIG. 2 is an enlarged side view of the vehicle cab heater shown in FIG. 1 removed from the vehicle.

DESCRIPTION OF THE PREFERRED EMBODIMENT

Figure 3:
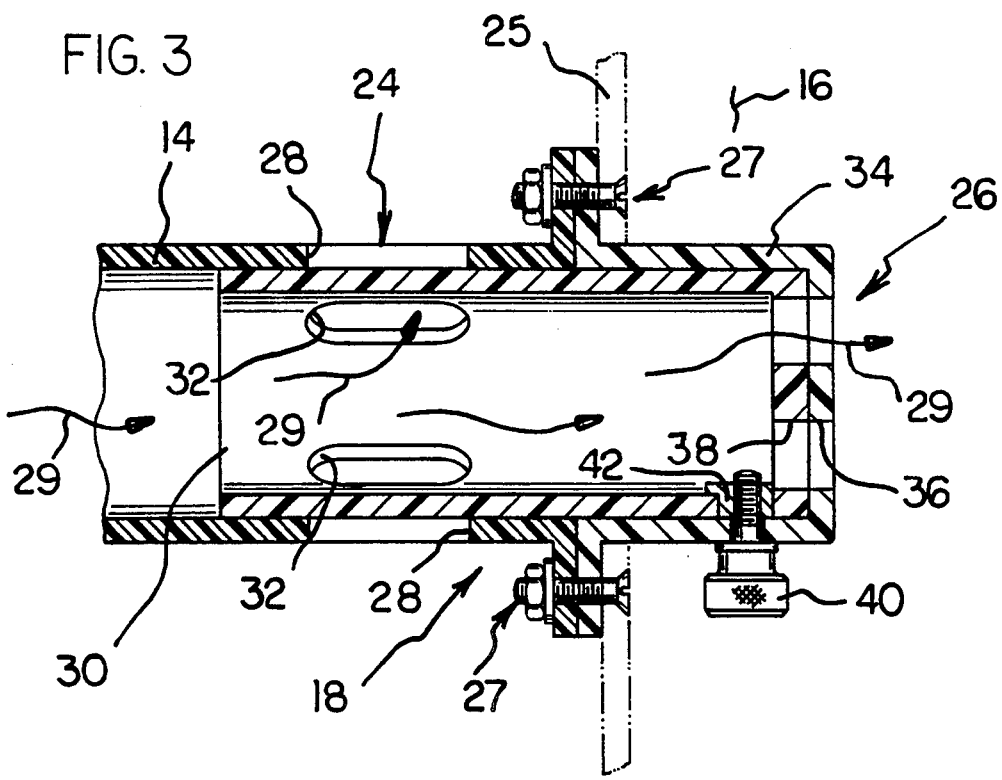
FIG. 3 is an enlarged cross-sectional view of a manually operated heat control valve assembly for the vehicle cab heater of FIG. 2 taken along line 3—3 thereof.
Figure 4:
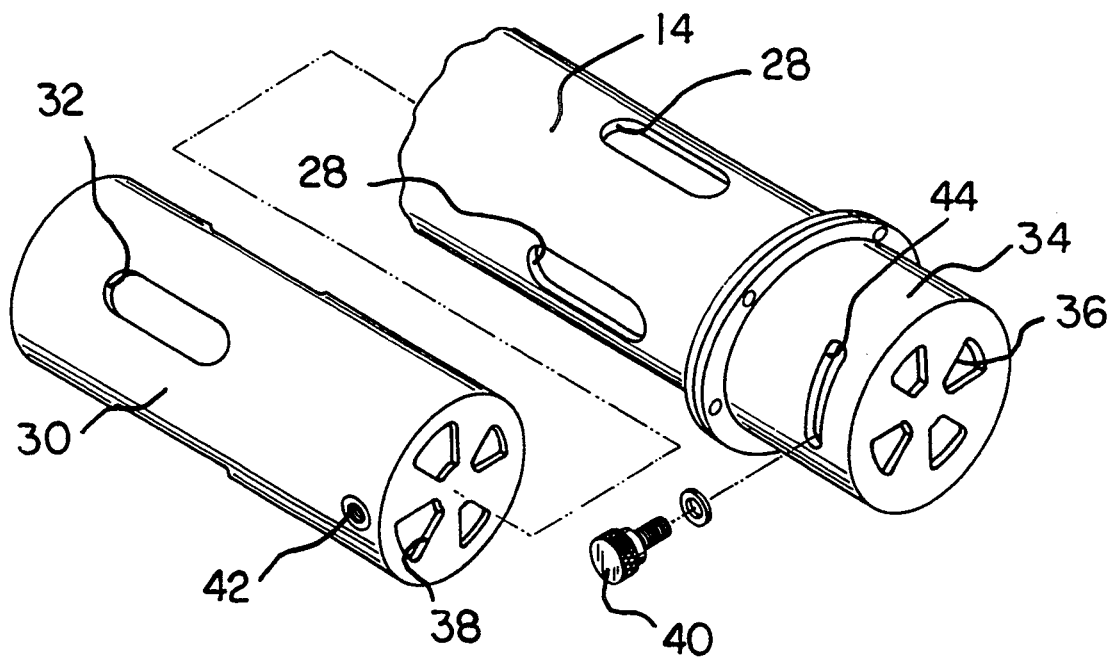
FIG. 4 is an exploded perspective view of the heat control valve assembly shown in FIG. 3.

With reference to the drawings, a new and improved vehicle cab heater embodying the principles and concepts of the present invention will be described.

Turning initially to FIGS. 1–4, there is shown a first exemplary embodiment of the vehicle cab heater of the invention generally designated by reference numeral 10. In its preferred form, vehicle cab heater 10 includes a shroud assembly 12 capable of fitting over a radiator and radiator fan on a water-cooled engine. A conduit 14 is connected between the vehicle cab 16 and the shroud assembly 12 for conveying heated air from the radiator to the vehicle cab 16. A manually operated valve assembly 18 is located at an end of the conduit 14. The valve assembly 18 includes an exterior portion 20 located outside of the vehicle cab 16 and includes an interior portion 22 located inside the vehicle cab 16. The valve assembly 18 includes an exterior valve subassembly 24 for controlling air flow from the shroud assembly 12 to outside the vehicle cab 16, and the valve assembly 18 also includes an interior valve subassembly 26 for controlling air flow from the shroud assembly 12 to inside the vehicle cab 16. The conduit 14 can be made from PVC tubing. The exterior portion 20 is separated from the interior portion 22 by a window 25 of the vehicle cab 16. Nut and bolt assemblies 27 are used to fix the conduit 14 and the extension assembly 34 to the window 25 and to each other. The exterior valve subassembly 24 includes a first external aperture 28 in the conduit 14, and a manually adjustable valve element 30 is located inside the conduit 14. The valve element 30 includes a first internal aperture 32 capable of being selectively placed in registration with the first external aperture 28, such that warmed air from the shroud assembly 12 can be selectively retained in or exited from the conduit 1.4 to outside the vehicle cab 16.

The interior valve subassembly 26 includes an extension assembly 34 capable of being juxtaposed against the conduit 14. The extension assembly 34 extends into the vehicle cab 16 from the conduit 14. A second external aperture 36 is located on the extension assembly 34, and a manually adjustable valve element 30 is located inside the extension assembly 34. The valve element 30 includes a second internal aperture 38 capable of being selectively placed in registration with the second external aperture 36, such that warmed air from the shroud assembly 12 can be selectively retained in or exited from the conduit 14 into the vehicle cab 16.

The valve element 30 is a single valve element that includes the first internal aperture 32 and the second internal aperture 38. A handle assembly 40 is capable of being attached to the valve element 30. The valve element 30 includes a handle-receiving portion 42, and a guide slot 44 located in the extension assembly 34. The guide slot 44 is capable of permitting a portion of the handle assembly 40 to pass through the extension assembly 34 for connecting the handle assembly 40 to the valve element 30. The guide slot 44 serves to limit movement of the valve element 30 with the conduit 14 and the extension assembly 34, such that range of motion of the first internal aperture 32 and the second internal aperture 38 is limited with respect to the first external aperture 28 and the second external aperture 36, respectively. The handle assembly 40 has a threaded portion that screws into a complementary threaded portion in the valve element 30. When the handle assembly 40 is sufficiently tightened, it serves to lock the valve element 30 into a selected position with respect to the extension assembly 34.

The second internal aperture 38 and the first internal aperture 32 are oriented on the valve element 30, and the first external aperture 28 and the second external aperture 36 are oriented on the conduit 14 and the extension assembly 34, respectively, such that, when the handle assembly 40 is located at one extremity of the guide slot 44, the first internal aperture 32 and the first external aperture 28 are in full registration, the second internal aperture 38 and the second external aperture 36 are completely out of registration, and air flows from the shroud assembly 12 to outside the vehicle cab 16 without any air flowing from the shroud assembly 12 to inside the vehicle cab 16.

In contrast, as shown in FIG. 3, by the arrow pattern 29, when the handle assembly 40 is located at another extremity of the guide slot 44, the first internal aperture 32 and the first external aperture 28 are completely out of registration, the second internal aperture 38 and the second external aperture 36 are in complete registration, and air flows from the shroud assembly 12 to inside the vehicle cab 16 without any air flowing from the shroud assembly 12 to outside the vehicle cab 16. When the handle assembly 40 is located at a location in between the extremities of the guide slot 44, the first internal aperture 32 and the first external aperture 28 are in partial registration, the second internal aperture 38 and the second external aperture 36 are in partial registration, and a portion of air owing from the shroud assembly 12 flows to outside the vehicle call 16, and a portion of the air flowing from the shroud assembly 12 flows to inside the vehicle cab 16.

When the motor is first turned on and cold, the air flowing from the shroud assembly 12 is cold. In this condition, the valve element 30 would be adjusted so that all of the air coming from the shroud assembly 12 would be directed to outside the vehicle cab 16. However, when the air was sufficiently warm, then the valve element 30 could be adjusted so that all of the air from the shroud assembly 12 would be directed to inside the vehicle cab 16, which at this stage, would be at ambient temperature. After the vehicle cab 16 is warmed up to a desired temperature, the valve element 30 could be adjusted so that a portion of the air from the shroud assembly 12 is vented to outside the vehicle cab 16 and a portion of the air is directed to inside the vehicle cab 16. This can be used to maintain the interior of the vehicle cab 16 at a desired, comfortable temperature.

Figure 5:
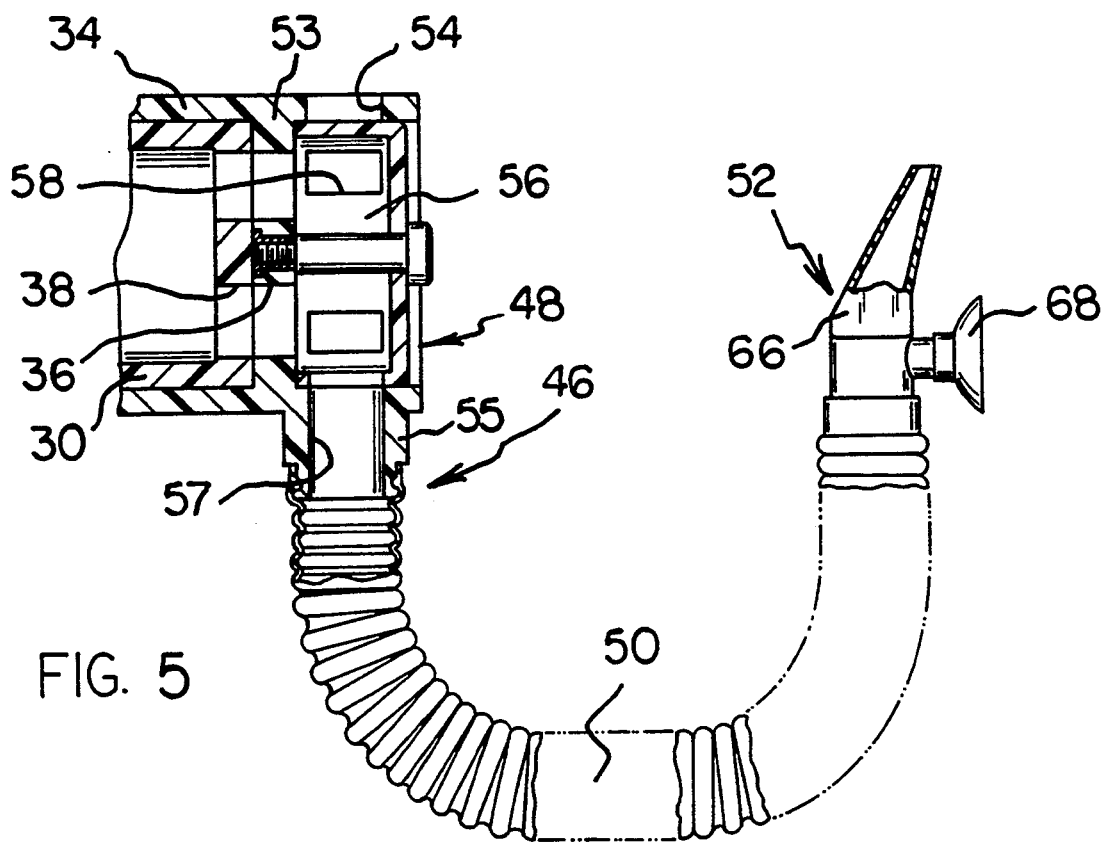
FIG. 5 is a side view, partially broken away, of a second embodiment of the vehicle cab heater of the invention which includes a flexible hose and nozzle for directing warm air to a desired location in the vehicle cab.
Figure 6:
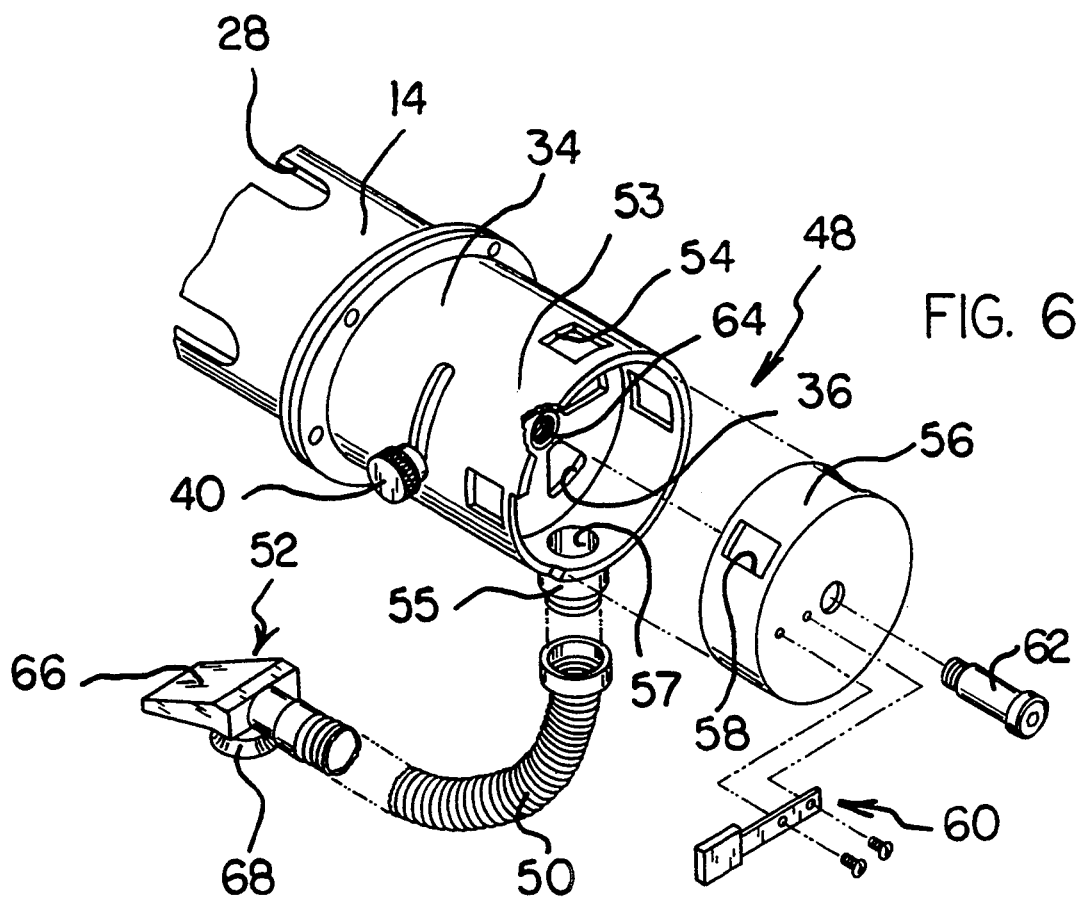
FIG. 6 is a partially exploded valve assembly used to control air directed to the flexible hose and nozzle in FIG. 5.

Turning to FIGS. 5-6, a second embodiment of the invention is shown. Reference numerals are shown that correspond to like reference numerals that designate like elements shown in the other figures. In addition, a flexible hose assembly 46 is attachable to the extension assembly 34. The flexible hose assembly 46 permits air from the shroud assembly 12 to be selectively directed to selected locations in the vehicle cab 16. The flexible hose assembly 46 includes a valve assembly 48 for controlling air flow exiting from the extension assembly 34. A flexible hose 50 is connected to the valve assembly 48, for channeling air flow to manually selected locations inside the vehicle cab 16, and a nozzle assembly 52 is connected to the valve assembly 48, for directing air flow to the selected locations inside the vehicle cab 16.

The valve assembly 48 includes an exterior extension 53 portion which extends out from the extension assembly 34. A first exterior aperture 54 is located on the exterior extension 53 and is in direct communication with the interior of the vehicle cab 16. A hose connector fixture 55 extends from the exterior extension 53. A second exterior aperture 57 is located in the hose connector fixture 55 for directing air from the extension assembly 34 into the flexible hose 50. A manually rotatable interior valve member 56 is supported inside the exterior extension 53. An interior aperture 58 is located on the interior valve member 56, and a handle assembly 60 is used for manually rotating the interior valve member 56 inside the exterior extension 53, such that the interior aperture 58 can be selectively placed in registration with the exterior aperture 54 for directing warmed air directly into the vehicle cab 16 or selectively placed in registration with the first exterior aperture 54 for directing warmed air into the flexible hose 50.

More than one interior aperture 58 is used on the interior valve member 56, and more than one first exterior aperture 54 is used on the exterior extension 53. The plural respective interior apertures 58 and the first exterior apertures 54 are arranged so that partial registration can be obtained, and some air from the extension assembly 34 can be directed into the flexible hose 50 and some air can be directed directly into the vehicle cab 16. A threaded lock bolt 62 screws into a complementary threaded well 64 which is located in the exterior extension 53. The lock bolt 62 is used to lock the interior valve member 56 into a selected position with respect to the exterior extension 53.

The nozzle assembly 52 includes a nozzle element 66 attached to the flexible hose 50, and a suction cup 68 attached to the nozzle element 66. The nozzle element 66 can be put to a number of different uses. It can be placed on the floor of the vehicle cab 16 so that it can be used to warm a driver's feet. Alternatively, it can be used to defrost a window. The suction cup 68 can be used to stick the nozzle element 66 onto a window. Preferably, the extension assembly 34 and the exterior extension 53 are formed as a unified structure.

Figure 7:
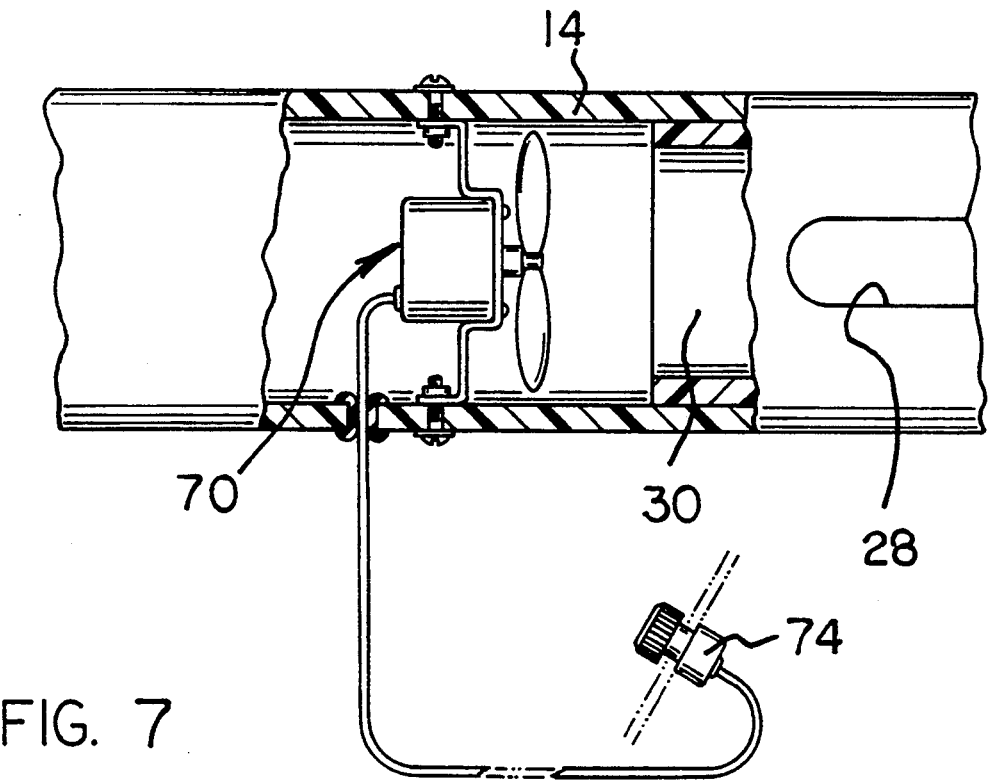
FIG. 7 is a side view, partially broken away, of a third embodiment of the invention which includes a battery-powered fan for moving air in the heating apparatus.
Figure 8:
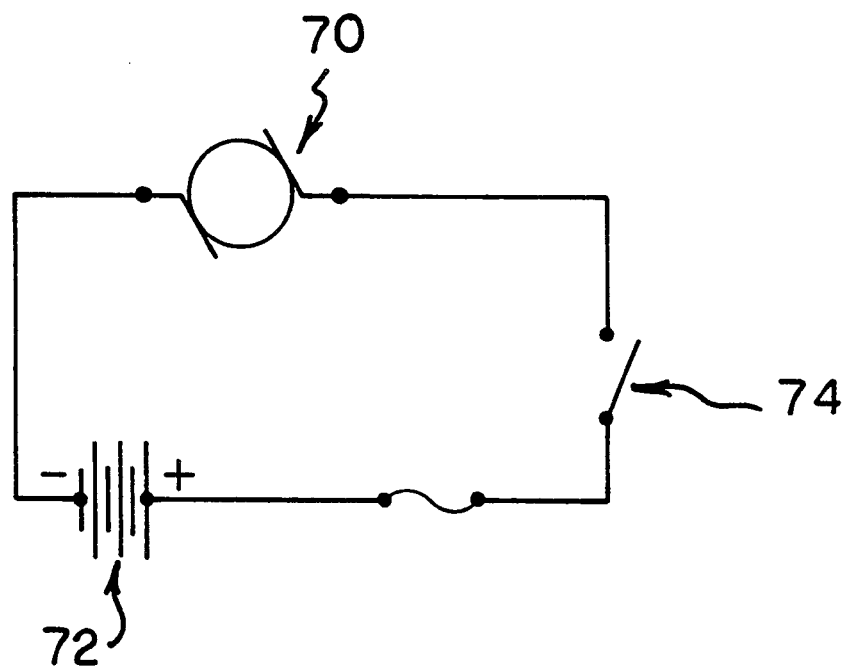
FIG. 8 is an electrical schematic diagram for the battery-powered shown in FIG. 7.

Turning to FIGS. 7-8, a third embodiment of the invention is shown. Reference numerals are shown that correspond to like reference numerals that designate like elements shown in the other figures. In addition, an optional fan assembly 70 is located within the conduit 14. A battery 72, which can be the vehicle battery, is used for powering the fan assembly 70, and a switch 74 is used for controlling electric power flow from the battery 72 to the fan assembly 70. The fan assembly 70 in the conduit 14 increases air flow, and in doing so, provides for more rapid cooling of the radiator in the engine and provides more heated air at a faster rate to the vehicle cab 16.

The shroud assembly 12 can be made from a plastic material that is heat resistant. For the specific Bobcat brand skidloader mentioned above, a 15 gallon barrel that is cut in half is suitable as the shroud assembly 12. In this case, the half of the barrel shields both the radiator and a portion of the muffler which lie close together in a parallel orientation. The conduit 14 and other components attached to the conduit 14 can be made from plastic materials.

To install the vehicle cab heater 10 of the invention on an industrial vehicle, preferably, the grill is removed from the radiator. If desired, a baffle (not shown) can be used to enclose portions of the radiator that are not enclosed by the shroud assembly 12. Plywood can be used to form the baffle. The vehicle cab heater 10 of the invention can be made as a kit for retrofitting industrial vehicles. Alternatively, the vehicle cab heater 10 can be installed at the factory that produces the industrial vehicles.

The vehicle cab heater 10 of the invention is easier to install than conventional heater systems. No heater hoses are used that carry liquid coolant. There is no absolute need for an electric fan. The cab space occupied by the vehicle cab heater 10 of the invention is at a minimum. When the valve assembly 18 is attached to the rear window 25 of the vehicle cab 16, there is still good vision out the window 25. The window 25 can be made of an acrylic plastic material.

The valve assembly 18 can assume a variety of forms in addition to the ones disclosed above. For example, the valve assembly 18 can be in the form of a simple T-shaped valve in which one branch leads to outside the vehicle cab 16 and the other branch leads to inside the vehicle cab 16. A simple plate element can serve to control air flow to either one branch, the other branch, or a combination of both branches.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved vehicle cab heater that is low in cost, relatively simple in design and operation, and which may advantageously be used to provide heat to the cab without using hoses carrying liquid coolant into the cab of the vehicle. With the invention, a vehicle cab heater is provided which is easy to retrofit to the vehicle cab. With the invention, a vehicle cab heater is provided which is very simple in construction. With the invention, a vehicle cab heater is provided which can employ inexpensive off-the-shelf items. With the invention, a vehicle cab heater is provided which has an easy way to regulate the amount of heat that is directed to the cab. With the invention, a vehicle cab heater is provided which includes a flexible hose that would permit concentration of warm air onto selected areas inside the vehicle cab. With the invention, a vehicle cab heater is provided which includes means for supporting a nozzle on a flexible hose in a desired position. With the invention, a vehicle cab heater is provided which includes only a minimum of moving parts. With the invention, a vehicle cab heater is .provided which utilizes both the heat of the radiator and the heat of the muffler for heating the interior of the vehicle cab. With the invention, a vehicle cab heater is provided which utilizes the radiator fan for blowing warm air into the vehicle cab.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A vehicle cab heater, comprising:
   a shroud assembly capable of fitting over a radiator and radiator fan on a water-cooled engine,
   a conduit connected between the vehicle cab and said shroud assembly for conveying heated air from the radiator to the vehicle cab, and
   a manually operated valve assembly located at an end of said conduit, said valve assembly including an exterior portion located outside of the vehicle cab and including an interior portion located inside the vehicle cab, wherein said valve assembly includes an exterior valve subassembly for controlling air flow from said shroud assembly to outside the vehicle cab, and wherein said valve assembly also includes an interior valve subassembly for controlling air flow from said shroud assembly to inside the vehicle cab,
   wherein said exterior valve subassembly includes:
   a first external aperture in said conduit, and
   a manually adjustable valve element located inside said conduit, said valve element including a first internal aperture capable of being selectively placed in registration with said first external aperture, such that warmed air from said shroud assembly can be selectively retained in or exited from said conduit to outside the vehicle cab.

2. The apparatus described in claim 1 wherein said interior valve subassembly includes:
   an extension assembly capable of being juxtaposed against said conduit, said extension assembly extending into the vehicle cab from said conduit,
   a second external aperture located on said extension assembly, and a manually adjustable valve element located inside said extension assembly, said valve element including a second internal aperture capable of being selectively placed in registration with said second external aperture, such that warmed air from said shroud assembly can be selectively retained in or exited from said conduit into the vehicle cab.

3. The apparatus described in claim 2 wherein said valve element is a single valve element that includes said first internal aperture and said second internal aperture.

4. The apparatus described in claim 3, further including:
- a handle assembly capable of being attached to said valve element, wherein said valve element includes a handle-receiving portion, and
- a guide slot located in said extension assembly, said guide slot capable of permitting a portion of said handle assembly to pass through said extension assembly for connecting said handle assembly to said valve element.

5. The apparatus described in claim 4 wherein said second internal aperture and said first internal aperture are oriented on said valve element, and said first external aperture and said second external aperture are oriented on said conduit and said extension assembly, respectively, such that,
- when said handle assembly is located at one extremity of said guide slot, said first internal aperture and said first external aperture are in full registration, said second internal aperture and said second external aperture are completely out of registration, and air flows from said shroud assembly to outside the vehicle cab without any air flowing from said shroud assembly to inside the vehicle cab,
- when said handle assembly is located at another extremity of said guide slot, said first internal aperture and said first external aperture are completely out of registration, said second internal aperture and said second external aperture are in complete registration, and air flow from said shroud assembly to inside the vehicle cab without any air flowing from said shroud assembly to outside the vehicle cab, and
- when said handle assembly is located at a location in between said extremities of said guide slot, said first internal aperture and said first external aperture are in partial registration, said second internal aperture and said second external aperture are in partial registration, and a portion of air flowing from said shroud assembly flows to outside the vehicle cab, and a portion of the air flowing from said shroud assembly flows to inside the vehicle cab.

6. The apparatus described in claim 1, further including:
- a flexible hose assembly attachable to said extension assembly, said flexible hose assembly permitting air from said shroud assembly to be selectively directed to selected locations in the vehicle cab.

7. The apparatus described in claim 6 wherein said flexible hose assembly includes:
- a valve assembly for controlling air flow exiting from said extension assembly,
- a flexible hose, connected to said valve assembly, for channeling air flow to manually selected locations inside the vehicle cab, and
- a nozzle assembly, connected to said valve assembly, for directing air flow to selected locations inside the vehicle cab.

8. The apparatus described in claim 7 wherein said valve assembly includes:
- an exterior extension portion which extends out from said extension assembly,
- a first exterior aperture located on said exterior extension and in direct communication with the interior of the vehicle cab,
- a hose connector fixture extending from said exterior extension,
- a second exterior aperture located in said hose connector fixture for directing air from said extension assembly into said flexible hose,
- a manually rotatable interior valve member supported inside said exterior extension,
- an interior aperture located on said interior valve member, and
- a handle assembly for manually rotating said interior valve member inside said exterior extension, such that said interior aperture can be selectively placed in registration with said exterior aperture for directing warmed air directly into the vehicle cab or selectively placed in registration with said first exterior aperture for directing warmed air into said flexible hose.

9. The apparatus described in claim 8, further including:
- a threaded lock bolt and a complementary threaded well located in said exterior extension, wherein said lock bolt is used to lock said interior valve member into a selected position with respect to said exterior extension.

10. The apparatus described in claim 7 wherein said nozzle assembly includes:
- a nozzle element attached to said flexible hose, and suction cup attached to said nozzle element.

11. The apparatus described in claim 1, further including:
- a fan assembly located within said conduit.

12. The apparatus described in claim 11, further including:
- a battery for powering said fan assembly, and
- a switch for controlling electric power flow from said battery to said tan assembly.

* * * * *